United States Patent

Gay et al.

[11] Patent Number: 5,449,478
[45] Date of Patent: Sep. 12, 1995

[54] CONTOURED SEATING CONSTRUCTION AND METHOD

[75] Inventors: Dwight S. Gay, Fenton; John W. Hoornstra, Vassar, both of Mich.

[73] Assignee: Gunnell, Inc., Millington, Mich.

[21] Appl. No.: 60,739

[22] Filed: May 11, 1993

[51] Int. Cl.⁶ .............................................. B29C 44/16
[52] U.S. Cl. ................... 264/45.2; 264/46.6; 264/222
[58] Field of Search ............. 264/222, 46.6, 45.2, 264/314

[56] References Cited

U.S. PATENT DOCUMENTS

| | | | |
|---|---|---|---|
| 3,222,843 | 12/1965 | Schneider | 264/45.2 |
| 4,615,856 | 10/1986 | Silverman | 264/222 |
| 4,622,185 | 11/1986 | Kostich | 264/45.2 |
| 4,719,063 | 1/1988 | White | 264/222 |
| 4,903,690 | 2/1990 | Campbell | 264/45.2 |
| 5,095,849 | 3/1992 | Cutler | 264/222 |

FOREIGN PATENT DOCUMENTS

| | | | |
|---|---|---|---|
| 2250681 | 4/1974 | Germany | 264/222 |
| 59-214628 | 12/1984 | Japan | 264/46.6 |

OTHER PUBLICATIONS

IBM Technical Disclosure Bulletin vol. 12, No. 4 (Sep. 1969).

*Primary Examiner*—Allan R. Kuhns
*Attorney, Agent, or Firm*—Learman & McCulloch

[57] ABSTRACT

Custom-profiled seating for a wheel chair or other body support seating systems includes seat and backrest members having outer covers in which a liner bag is removably accommodated and into which expandable, curable foam-in-place material is introduced to conform to that portion of a person's body which is to engage seat or backrest to attain a custom fit. The seat and backrest members are provided with access openings sufficiently large to enable the liner and resultant foam cushion member within the liner to be removed from the cavity for reshaping or replacement.

5 Claims, 5 Drawing Sheets

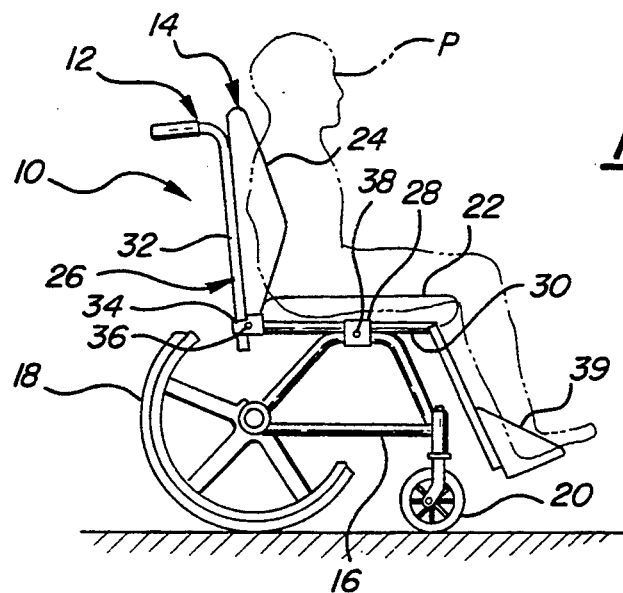
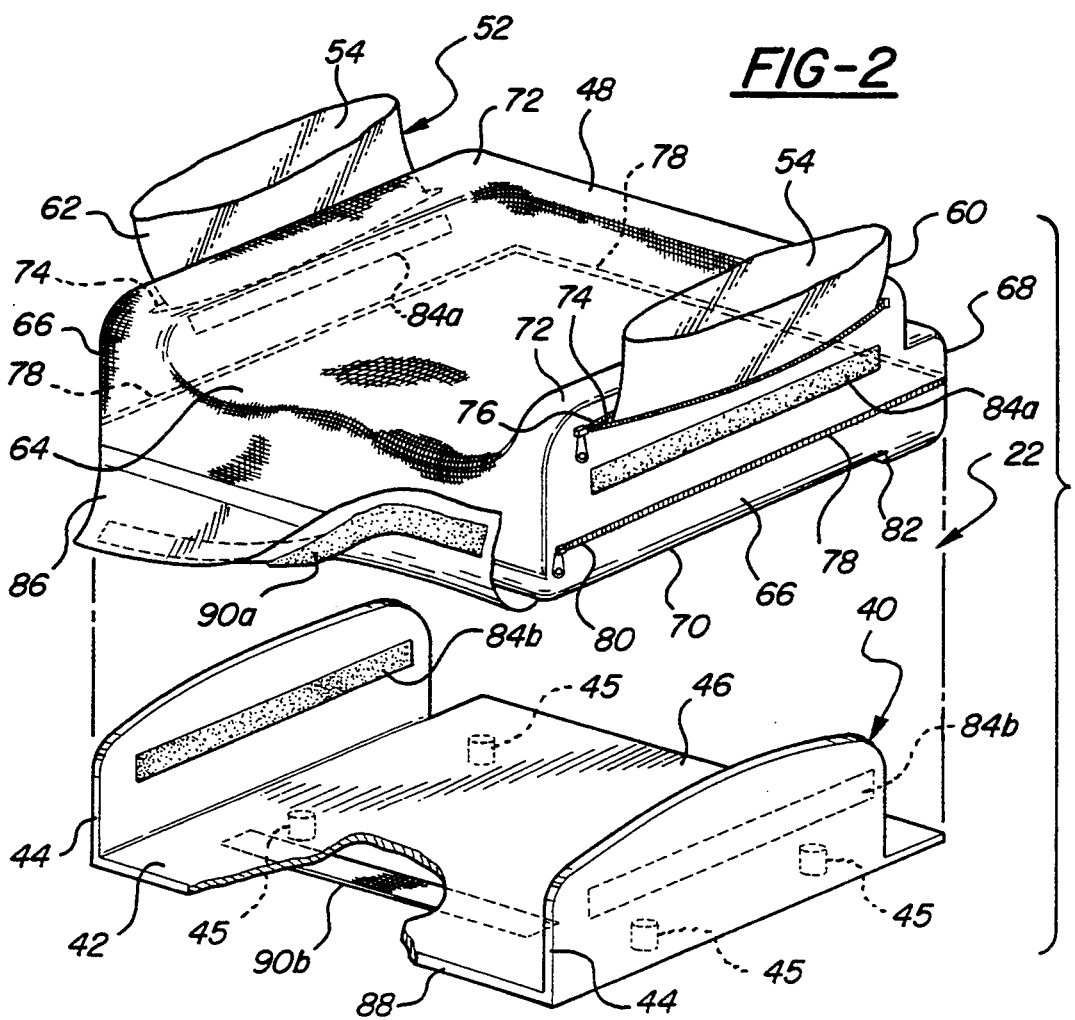

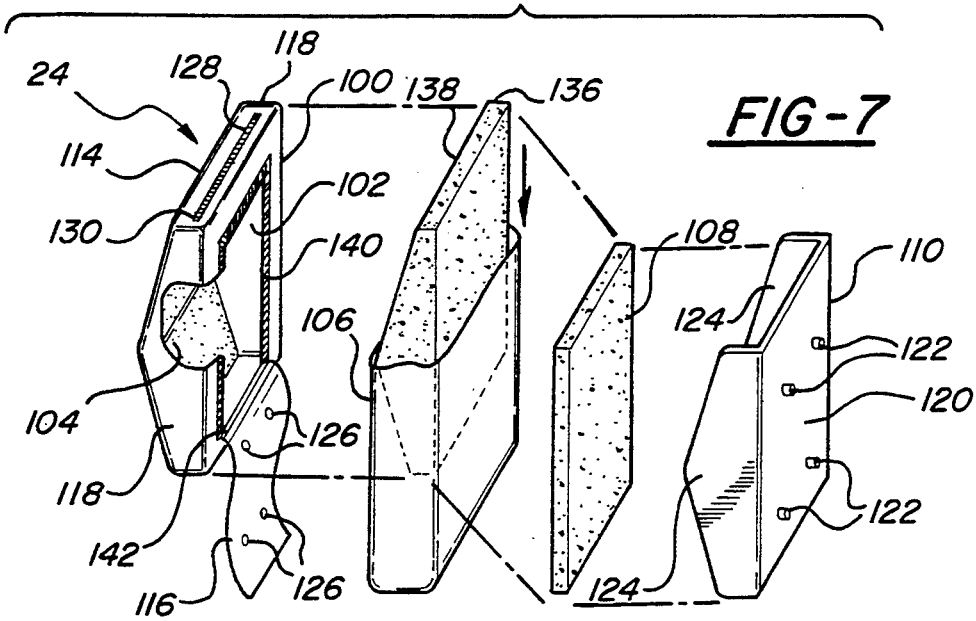
FIG-7
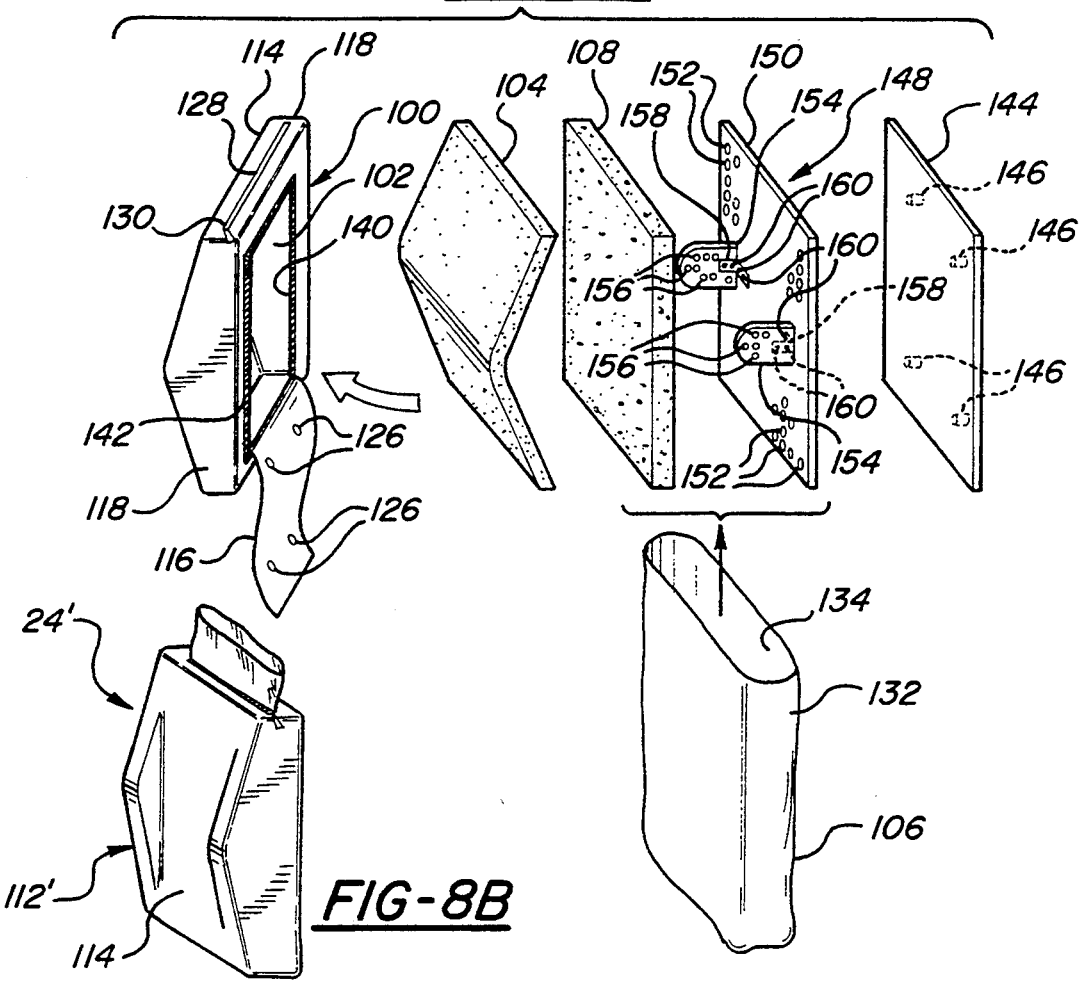
FIG-8A
FIG-8B

CONTOURED SEATING CONSTRUCTION AND METHOD

TECHNICAL FIELD

This invention relates to a custom-contoured seating construction for a wheel chair or other patient support for use primarily by a person who has little or no control over his movements and in some cases physical deformities, and to a method for producing such a seating construction.

BACKGROUND

Wheel chairs and other patient supports have long been available for use primarily by persons that have little or no control over their body movements and who therefore must be confined to such wheel chairs or other patient supports. Some of the users have physical deformities as a consequence of which they are inadequately supported by a conventional wheel chair seating system producing pressure points which can cause great discomfort to the patient.

SUMMARY OF THE INVENTION

A custom-contoured seat assembly includes a rigid seat support and a rigid back support on which a seat cushion and back cushion, respectively, are supported. Each cushion includes an outer bag defining a cavity within which is a liner bag. Expandable, curable liquid foam-in-place material is introduced to the liner bag through inlet means whereupon the material expands and conforms to the profile of that part of a person's body supported on the outer bag and thereafter cures to define a supportive cushion member within the liner bag having a profiled support surface conforming to the person's body profile. The outer bag is provided with an access opening to enable removal of the liner bag and the cushion member from the cavity.

The resultant cushion assembly of this invention is custom contoured to the person's body profile so as to provide total body support and accommodate any physical deformities the user may have. Moreover, in the event that the as-formed profile of the cushion member is found not to conform satisfactorily to the person's body profile, or, should the person's body profile change over time, the liner bag enables the molded cushion member to be removed from the outer bag cavity for modification of the cushion member profile or, alternatively, to enable a fresh liner bag to be positioned in the cavity and a new foam-in-place cushion member produced utilizing the same outer bag.

Another advantage of this invention is that no special equipment is needed to introduce the foam-in-place material into the liner bag thereby enabling on-site molding of a custom-contoured cushion assembly.

BRIEF DESCRIPTION OF THE DRAWINGS

Methods and apparatus according to the invention are disclosed in the following description and in the accompanying drawings, wherein:

FIG. 1 is a fragmentary side elevation view of a wheel chair having a seating construction according to this invention;

FIG. 2 is an exploded perspective view of a seat assembly;

FIG. 7 is an exploded perspective view showing the liner bag and backrest cushion removed from the outer backrest bag or cover;

FIG. 8A is an exploded perspective view like FIG. 5 of a second embodiment of the backrest assembly;

FIG. 8B is a perspective view on a reduced scale of an assembled backrest of FIG. 8A;

DETAILED DESCRIPTION OF THE INVENTION

Figure 3:
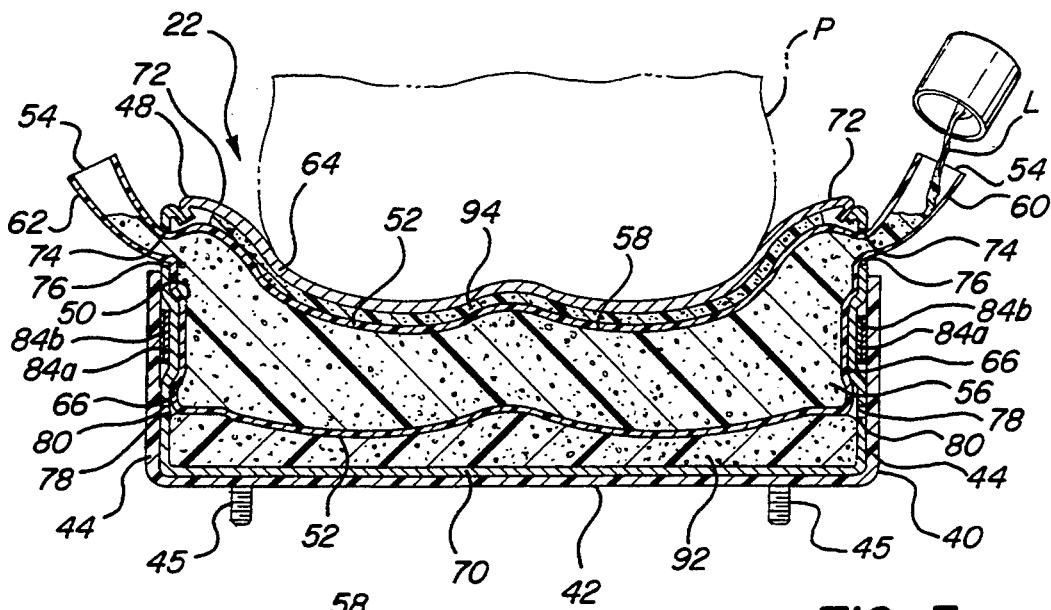
FIG. 3 is a transverse sectional view of the seat cushion.

A body support seating construction according to the embodiment shown in FIGS. 1-7 is designated generally by the reference character 10 and is adapted for use with a wheeled chair frame 12 of conventional construction on which a seat and back assembly 14 is removably supported. The frame 12 has a base 16 mounting a pair of relatively large diameter rear wheels 18 (only one shown) and a pair of swivelable front wheels 20 (only one shown) which together provide mobility to the frame 12.

The assembly 14 includes a seat assembly or unit 22 and an upstanding backrest assembly or unit 24 which together provide cushioned support for the body of an occupant P. The seat and backrest units 22, 24 are mounted on a body support portion 26 of the frame which is in turn coupled to the base 16 of the frame by coupling means 28. The body support frame 26 includes a seat mounting portion 30 mounting the seat unit 22 and an upstanding backrest mounting portion 32 mounting the backrest unit 24.

The seat and backrest units 22, 24 may be formed as one integral structure but preferably are provided as discrete assemblies, as will be described in greater detail below. The angle between the backrest and seat units 24, 22 may be fixed but preferably is adjustable by the provision of hinge means 34 joining the seat and backrest mounting portions of the frame 30, 32. The hinge means 34 includes pivot pins 36 (only one shown) connecting the backrest mounting portion 32 to the seat mounting portion 30 enabling the backrest unit 24 selectively to rock or pivot about the substantially horizontal axis of the pivot pins 36 to various positions of adjustment relative to the seat unit 22.

The coupling means 28 may mount the body support assembly 14 rigidly to the base 16 of the frame, but preferably includes pivot means in the preferred form of pivot pins 38 (only one shown) to enable the entire support assembly 14 and support frame 26 to rock as a unit relative to the base of the frame 16 about the horizontal axis of the pivot pins 38. The frame 12, including the pivot means 28 and hinge means 34, may correspond to that disclosed in U.S. Pat. No. 4,893,827. A footrest 39 also may be provided for supporting the feet of the occupant P.

As will be explained in greater detail below, the seat and backrest units 22, 24 are custom fitted to match the relevant portions of the occupant's body profile so as to provide full body contact support to the occupant P accommodating any physical deformities of the occupant's profile that would render the support offered by conventional prefabricated seating systems inadequate.

Figure 4:
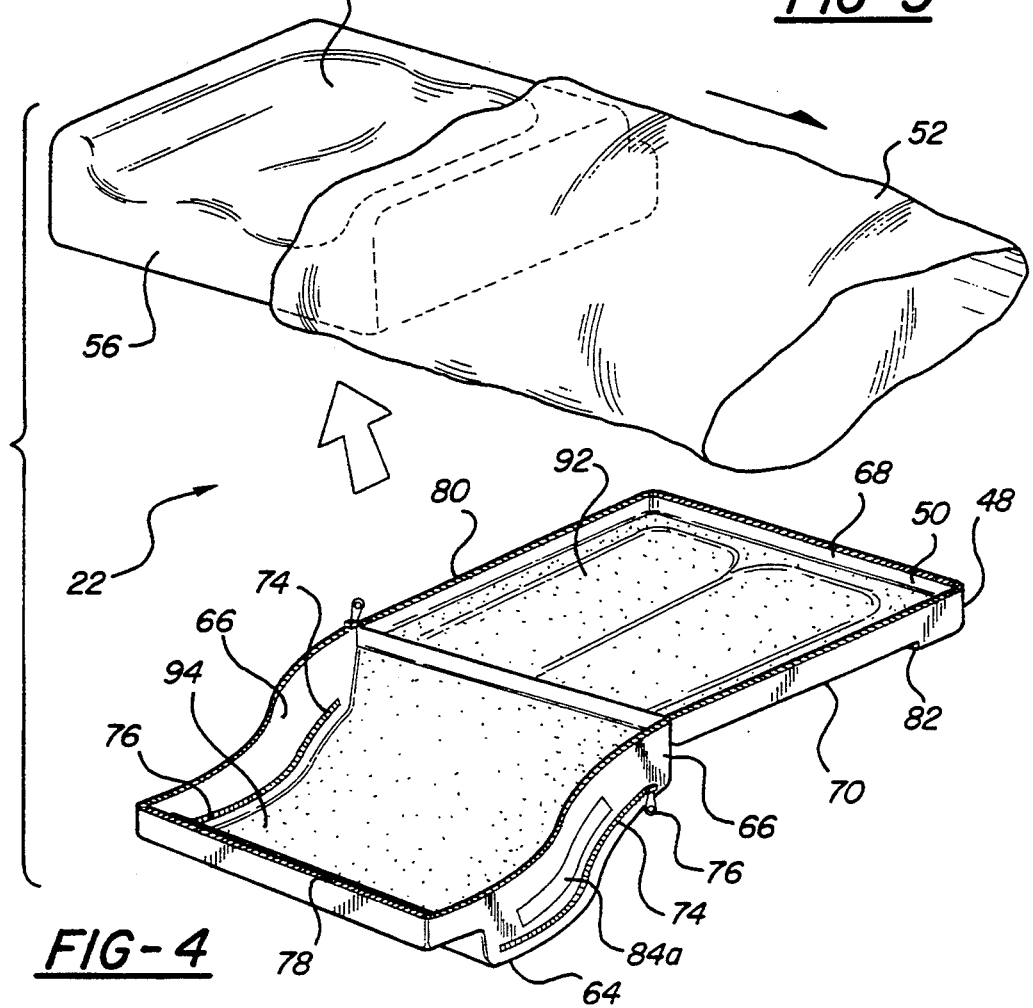
FIG. 4 is an exploded perspective view showing the liner bag and molded seat cushion removed from the outer bag or seat cover.

The construction of the seat unit 22 is best shown in FIGS. 2-4 and comprises a rigid cushion support panel or base 40 having a flat bottom 42 and a pair of upwardly projecting sides 44 that provide rigid lateral support to the seat unit 22. The bottom 42 includes means for mounting the panel 40 on the frame 12 and may comprise a plurality of threaded mounting studs 45, as shown, or other suitable means such as holes for receiving fasteners. A back edge 46 of the cushion support panel 40 extends beyond the sides 44 to underlie the seat unit 22 when mounted on the frame 12. The panel 40 preferably is molded of glass fiber composite material.

A pliable, outer seat cushion enclosure or bag 48 forms a cavity 50 for the removable accommodation of an inner liner bag 52. The liner bag 52 comprises a thin-walled plastic bag or sleeve fabricated of polyethylene film. The liner bag 52 has two inlets 54 through which a known expandable, curable, liquid foam-in-place (FIP) material L may be poured into the liner bag 52 for subsequent expansion. The person for whom the seat is being formed may be supported in a position just above the outer bag so that expansion of the FIP material enables that surface or upper body supporting portion 58 which confronts the person to conform to that of the occupant's body profile. The inlet 54 for the seat unit 22 comprises at least one and preferably a pair of spouts 60, 62 at opposite ends of the liner bag 52, as illustrated in FIGS. 2 and 3, forming openings into the liner bag 52, one through which the liquid FIP material may be introduced into the liner 52 and the other serving as a vent.

As shown best in FIG. 2, the seat cover 48 has an upper seating surface panel 64 that generally defines the seating surface on which the occupant is supported while seated. The cover 48 also includes a pair of laterally spaced side panels 66, a back panel 68, and a bottom panel 70. The panels are fabricated and assembled to have the general contours desired including uppermost extending lateral support regions 72 each provided with an access opening 74 permitting access to the spouts 54 of the liner bag while the liner bag 52 is accommodated in the cavity 50. The open ends 60, 62 of the liner bag 52 are extendable out of the cavity 50 through the access openings 74, as shown in FIGS. 2 and 3. Each access opening 74 is provided with a closure and preferably a zipper 76 to enable the opening 74 to be selectively opened and closed as needed. The openings 74 extend substantially across the front-to-back length of the side panels 66 to provide a wide opening to accommodate the similarly wide opening of the liner bag 52.

Below each access opening 74 is a larger cushion access opening 78 that allows the seat cover 48 to be opened sufficiently wide to enable removal of the seat cushion member 56 and liner bag 52. As shown in FIGS. 2 and 4, the cushion access opening 78 extends continuously along the back and side panels 68, 66 and enables the seat cover 48 to be laid open as shown in FIG. 4 for removal of the seat cushion member 56 from the cavity 50. This opening 78 also has a zipper closure 80 to enable the opening 78 to be opened and closed as needed.

The seat cover 48 is secured to the support panel 40 by inserting the back edge 46 of the panel 40 into a pocket 82 formed on the bottom side of the seat cover 48 near its back edge and extending laterally across the cover between the side panels 66. The cover 48 is positioned in the recess of the panel formed by the bottom 42 and sides 44 of the panel and further secured to the panel by the provision of hook and loop fastening strips 84a, 84b secured to each of the side panels 66 of the cover 48 below the inlet access openings 74 and further secured to the inside surface of the sides 44 of the support panel 40 as shown in FIG. 2.

The fastening strips 84a, 84b interlock with one another to assist in removably securing the seat cover 48 to the panel 40. The cover 48 also has a flap 86 extending from the front edge of the cover 48 and is adapted to be wrapped around a front edge 88 of the panel 40. The flap 86 and the underside of the panel 40 include similar hook and loop fastening strips 90a, 90b that interlock to assist in removably securing the cover 48 to the panel 40.

Once the cover 48 is supported by panel 40, the FIP material L may be introduced into the liner bag 52 by extending the ends 60, 62 of the liner bag 52 through the openings 74 in the cover 48 in the manner shown in FIGS. 2 and 3 after which the FIP material L may be poured into one or both open ends 60 and 62 of the liner bag 52. The FIP material L is available commercially as a kit by the Sun-Mate Corporation and sold under the brand name SUN-MATE. The FIP material is comprised of a mixture of polyol, ISO, and a catalyst.

The liner bag 52 acts as an impermeable barrier to the FIP material to prevent adherence of the FIP material L and the seat cover material 48, thereby enabling the molded seat cushion member 56 to be separated from the seat cover 48 following molding.

The liquid FIP material L initially is in a liquid state when poured into the liner bag 52 and there is a short time period (approximately one minute) before the material L commences to expand within the liner 52 toward development of the final seat cushion member 56. During this period, an attendant may evenly distribute the liquid FIP material L along the bottom of the liner bag 52 and as much as possible the liner itself is smoothed out prior to introducing the FIP material L to minimize wrinkling. Shortly before or soon after the FIP material commences to expand, the occupant P is placed on the seat unit 22 and supported in a position ultimately desired.

Before expansion, the liquid FIP material L provides inadequate cushion support to the occupant P. Preferably, a relatively thick (approximately 2 inches) prefabricated supportive foam cushion pad 92 is positioned in the cushion bag cavity 50 between the liner bag 52 and the cushion support panel 40 to support comfortable above the occupant the rigid support panel 40.

As the expansion progresses, the FIP material L will expand more in those areas which are not as compressed by the patient's weight and limbs as are other parts of the seat cover 48, thereby allowing the expanding FIP material to conform naturally to the body profile or contours of the occupant P. During expansion, the open ends 60, 62 of the liner bag 52 may be folded over to close off the inlet openings 54 so as completely to confine the expansion of the foam within the liner bag 52 and control the distribution of the expanding material to assure full development in the lateral regions 72 of the seat cover 48 and between the occupant's legs. Once full development is achieved, the spouts 60, 62 of the liner bag 52 may be reopened to vent any gases and allow any excess expanding FIP material L to escape from the liner bag 52. The fully developed FIP material L thereafter is allowed to cure forming the resultant seat cushion member 56 within the liner bag 52 having its upper seating surface 58 contoured to match the body profiles of the occupant P.

The spouts 60, 62 of the liner bag 52 and any foam contained therein may be trimmed off and the access openings 74 closed to conceal the liner bag 52 and cushion member 56 within the seat cover 48. As shown best in FIG. 3, a relatively thin layer (i.e., $\frac{1}{4}$ inch) of foam material 94 may be provided between the upper panel 64 of the seat cover 48 and the liner bag 52. This foam layer 94 preferably is adhered or otherwise secured to the back side of the upper panel 64 and serves to diminish any discomfort caused by creases or imperfections that may have formed on the support surface 58 of the seat cushion member 56 as a result of a wrinkled liner bag 52.

The upper seating surface panel 64 preferably is fabricated of a stretchable material and preferably a laminant having a woven nylon upper surface layer 96 and an imperforate, closed cell neoprene rubber backing layer 98 laminated to the nylon surface layer 96. This material is able to stretch and expand as the FIP material expands to achieve good conformance to the person's body profile. A presently preferred material for the seating surface panel 64 is sold under the trademark RUBATEX and is available from the Rubatex Corporation of Bedford, Va. The nylon material 96 enables air exchange between the occupant P and the seat unit 22 and the neoprene backing is water-impermeable to protect the foam cushion member 56 from moisture damage.

After the seat cushion member 56 has been molded, an attendant can check the fit of the seat 22 to the occupant P and determine whether any modifications to the seat cushion support surface 58 are needed to achieve a more suitable contoured fit to the occupant's profile. The trial period for evaluating the fit of the cushion member 56 may be a matter of hours, days, or even months during which the occupant is observed and monitored to assure that the support surface contour 58 properly matches the person's body profile.

It may be that the cushion member 56 was improperly contoured during molding or that the person's profile may have changed over time so as to render the as-molded contour of the cushion member 56 unsuitable. In either event, adjustments in the seat cushion support surface 56 may be made by removing the support panel 40 from the seat cover 48 and then opening the cushion access opening 78 to gain access to the cavity 50. Once opened, the cushion member 56 and the liner bag 52 may be removed as a unit from the cavity 50 and the support surface 58 modified by stripping the liner bag 52 off the cushion member 56 as illustrated in FIG. 4 and either cutting away unwanted foam material from the support surface 58 of the cushion member 56 or adding supportive foam material to the support surface 58 to change the contour. Once a proper fit is achieved, the modified cushion member 56 is repositioned in the cavity 50 with or without first replacing the liner bag 52 about the cushion member 56 after which the cover 48 may be closed and reattached to the support panel 40.

Should the seat cushion 56 become damaged or require modification beyond practical limits, it may be removed from the cavity 50 and a new liner placed within the cavity 50 of the same seat cover 48 following which a new cushion member may be molded using the same foam-in-place process as described above. The liner 52 thus enables the seat cover 48 to be reused.

FIGS. 5-9 illustrate the construction and method of forming various embodiments of the backrest unit 24 utilizing the same foam-in-place molding techniques as described above so as to custom fit the backrest unit 24 to the occupant P.

Figure 5A:
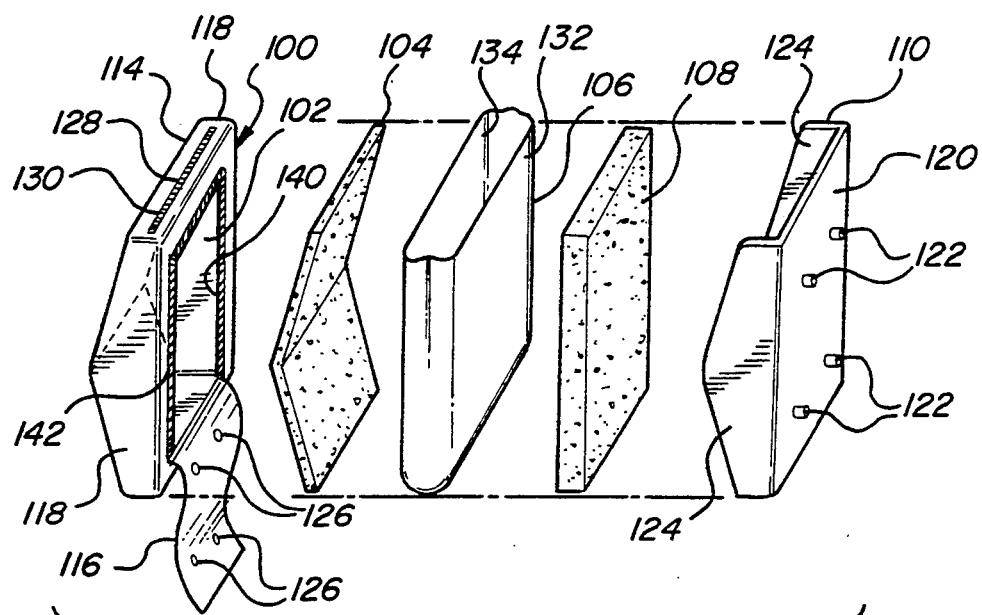
FIG. 5A is an exploded perspective view showing the components of a backrest assembly of the invention.
Figure 10:
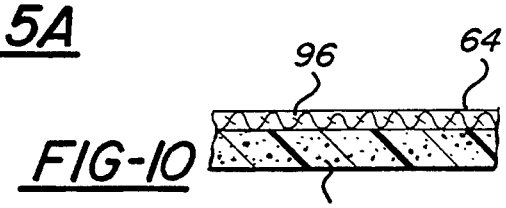
FIG. 10 is a fragmentary sectional view of the seating surface panel material of the backrest and seat cushion bags.
Figure 5B:
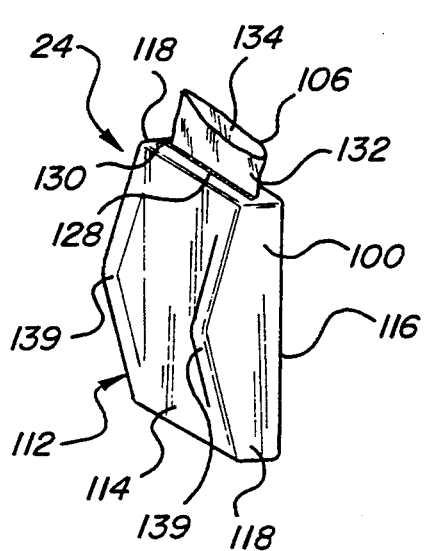
FIG. 5B is a perspective view on a reduced scale of the assembled backrest.
Figure 6:
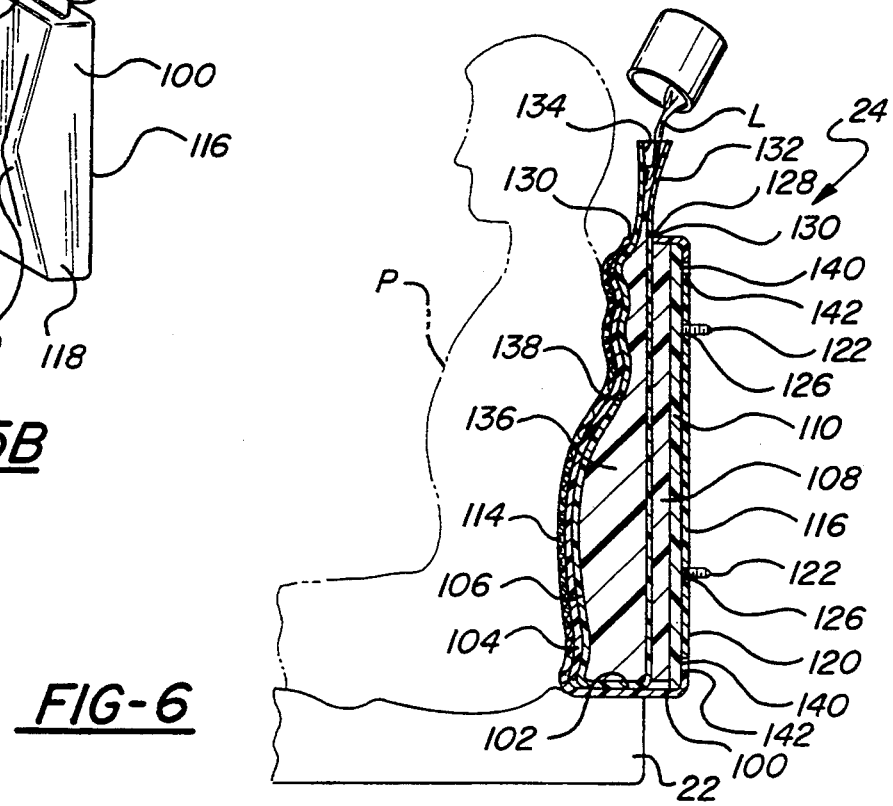
FIG. 6 is a sectional view of the backrest assembly showing the introduction of foam-in-place material into the liner bag.

A first embodiment of the backrest unit 24 is shown in FIGS. 5A, 5B, and 6 and includes a pliable backrest cushion bag or cover 100 having a cavity 102 within which is accommodated a first foam layer 104, a backrest liner bag 106, a second foam liner 108, and a backrest cushion support panel 110 forming the backrest assembly 112.

The backrest cover 100 has a front panel 114 formed of the same stretchable material as the upper panel 64 of the seat cover 48. The remaining portions of the backrest cover 100, including a back panel 116 and side panels 118, are formed from a pliable, non-stretchable vinyl material. The first foam layer 104 is the same type of material as the foam layer 94 of the seat cover 48 and is secured to the inside of the front panel 114 in the same manner as the seat foam layer 94 previously described.

The backrest support panel 110 is rigid and preferably molded of glass fiber composite material and includes a plurality of threaded mounting studs 122 secured to the back 120 of the panel 110 and projecting rearwardly for mounting the backrest unit 24 on the backrest mounting portion 32 of the frame 12. The panel 110 includes side portions 124 that project forwardly of the back 120 and provide rigid lateral support for the backrest unit 24. The second layer of foam 108 is the same type of material as that used for the foam layer 92 of the seat unit 22 and serves the same purpose as described previously. The back panel 116 is provided with a corresponding plurality of holes or apertures 126 through which the mounting studs 122 may extend.

The backrest cover 100 has an inlet opening 128 at the top of the cover 100 that substantially spans the lateral sides 118 of the cover 100. The opening 128 is provided with a closure and preferably a zipper 130 to enable the opening 128 to be opened and closed as needed. The backrest liner bag 106 is similar to the seat liner bag 52 except that the backrest liner bag 106 has only a single open end 132 providing a spout 134 into the liner bag 106 for receiving the same FIP material L to develop a backrest cushion member 136. As shown in FIGS. 5 and 6, the open end 132 of the liner bag 106 is extendable through the opening 128 in the backrest cover 100 to enable the FIP material L to be poured into the liner bag 106 while the liner bag 106 is positioned within the backrest cover 100.

The custom profiling of the backrest unit 24 is carried out in the same manner as that described for the seat unit 22. To profile the backrest unit 24, the occupant P is first positioned on a seating member and preferably the seating unit 22 which was previously custom profiled to the occupant's lower body profile. The seat 22 and backrest 24 units are preferably mounted on the frame 12 during molding of the seat and backrest members.

Once properly positioned on the seat unit 22, the occupant P is inclined forwardly and the liquid FIP material L poured into the liner 106 through the inlet opening 134. After a short time, the liquid FIP material L begins to expand filling the liner bag 106. During expansion of the material L, the occupant P is leaned back and supported in position against the front panel 114 of the backrest cover 100. As the material L expands and cures, it has a tendency to force the occupant P forwardly out of the desired position. To maintain proper positioning, it may be necessary to restrain the occupant P against forward movement through the use of restraining straps (not shown) secured to the chair frame 12. Alternatively, or in addition to physically restraining the occupant P, the pivot means 28 may be utilized to tilt or rock the seat 22 and backrest 24 units rearwardly causing the weight of the upper body to bear more heavily against the backrest unit 24 to assist in maintaining proper positioning.

As with the seat unit 22, the FIP material L expands more in those areas which are not as compressed by the patient's weight and less in the other areas, thereby conforming to the patient's upper body profile as shown in FIG. 6. The expanded FIP material thereafter cures to form the resultant backrest cushion member 136 within the liner 106 having a profiled support surface 138 that conforms to the person's upper body profile. As with the seat unit 22, the open end 132 of the liner bag 106 may be closed during expansion of the foam to control the flow of the foam and force it to cure from back to front toward the occupant P to assure that the forwardmost portions of the seat unit 24, such as the lateral side support regions 139, are filled with foam and the cushion member 136 fully developed in those regions 139.

Once cured, the spout portion 132 of the liner 106 extending out of the access opening 128 and any foam therein may be trimmed off and the remainder stuffed inside the backrest cover 100 and the access opening 128 closed to conceal the liner bag 106 and backrest cushion 136 within the cover 100.

The backrest cover 100 is provided with a cushion access opening 140 having a closure and preferably a zipper 142 to enable the access opening 140 to be selectively open and closed, like the access opening 78 of the seat cover 48. For the same reasons described previously with respect to the seat unit 22, it may be necessary to re-contour or replace the backrest cushion member 136. The cushion access opening 140 is of sufficient size to enable the backrest cushion 136 and liner 106 to be removed from the backrest cover cavity 102 as illustrated in FIG. 7 wherein the backrest cover 100 is shown with the access opening 140 having been opened and the support panel 110 and foam layer 108 removed from the cavity 102 along with the cushion member 136 and liner bag 106. The liner bag 106 is removed from the cushion member 136 as shown to enable modification of the cushion member support surface 138 in the same manner as previously described for modification of the seat cushion 56. Once the desired modifications have been made, the modified cushion member 136 may be repositioned in the cavity 102 with or without first having been covered by the liner bag 106. It may be desirable to place the cushion member 136 back in the liner bag 106 before replacement in the backrest cover 100 since the liner bag 106 acts as a protective moisture barrier for the cushion pad 136.

Figure 9:
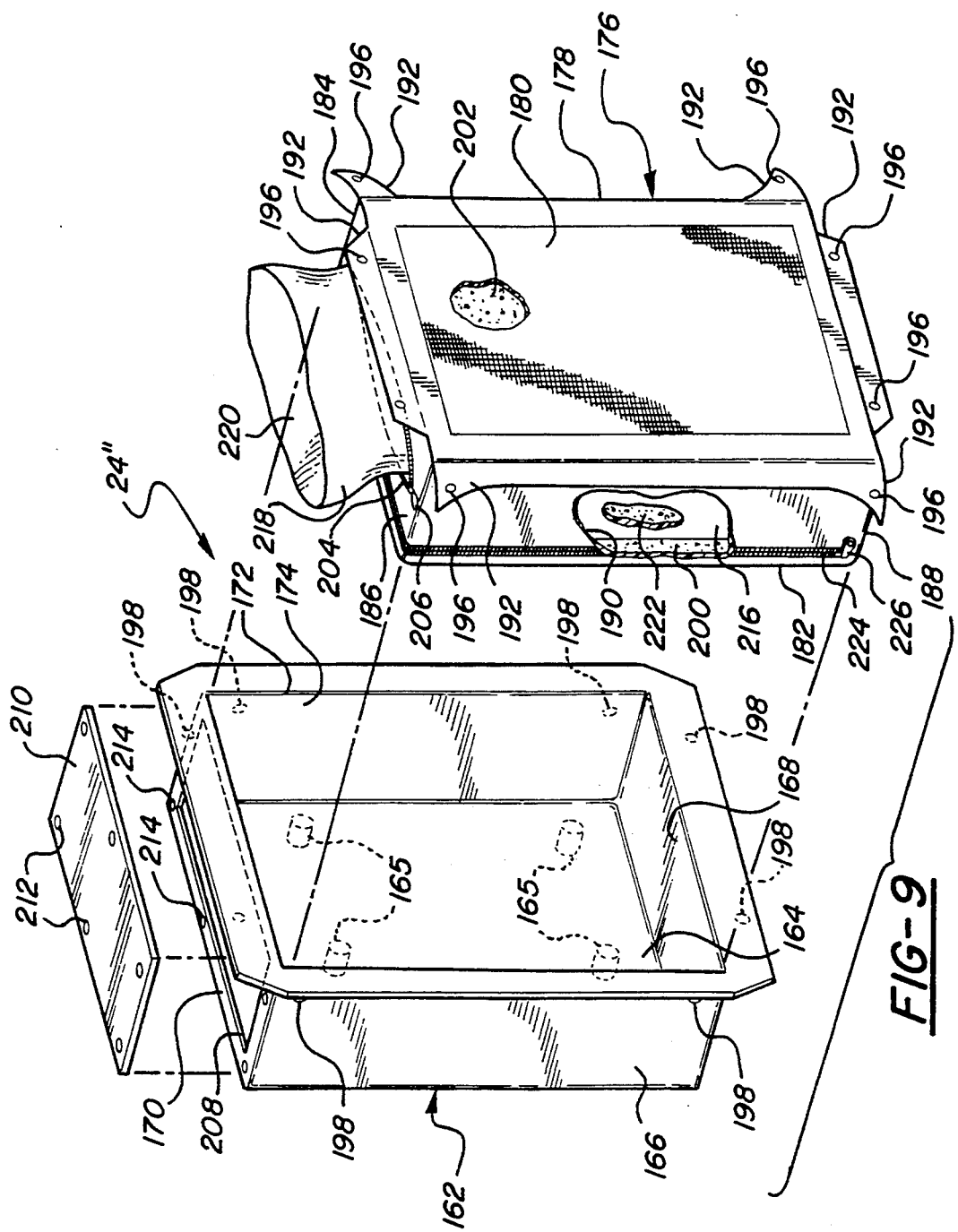
FIG. 9 is an exploded perspective view of a third embodiment of the backrest assembly.

FIGS. 8 and 9 show two other embodiments of the backrest unit of the invention which utilize the same foam-in-place molding technique to form a cushion contoured backrest.

The embodiment shown in FIGS. 8A and 8B is very similar in construction to the backrest unit 24 of FIGS. 5–7, the primary difference being that the molded support panel 110 of the earlier embodiment is replaced by a two-piece construction comprising a rigid flat support panel 144 and a separate rigid lateral support member 148. The support panel 144 is fabricated of the same rigid glass fiber composite material as the support panel 110 having similar threaded mounting studs 146 for mounting the backrest unit 24' on the frame 12. The lateral support member 148 comprises a rigid mounting board 150 perforated with a pattern of holes 152 and mounting a pair of forwardly projecting lateral supports 154, preferably fabricated of the same rigid material as the mounting board 150 and perforated with a similar pattern of holes 156. The material used for the board 150 and lateral supports 154 is commonly referred to as peg board. A pair of L-shaped mounting brackets 158 are secured to each of the lateral supports 154 and mounting board 150 by fasteners 160 that extend through one or more of the holes 152 and 156 of the mounting board 150 and lateral supports 154 to enable to the lateral supports 154 to be mounted on the board 150 in any one of a number of different positions of adjustment relative to the mounting board 150 and one another to accommodate the needs of the occupant P. This feature is particularly useful for occupants having abnormal lateral curvature of the spine since the occupant can be positioned and supported properly prior to molding the cushion member 136.

The remaining components of the seat unit 24' are the same as those of the first embodiment 24 and as such are identified by the same reference character numerals. The thin foam layer 104 is adhered to the back side of the seating support front panel 114 as in the first embodiment 24. The thick foam layer 108 and lateral support member 148 are inserted into the liner bag 106 and then positioned within the cavity 102 of the backrest cover 100. Appropriate adjustments to the position of the lateral supports 154 are made prior to placing the lateral support member 148 in the cavity 102 to support and position the occupant P properly during the subsequent FIP molding process. Finally, the rigid backrest panel 144 is inserted into the cavity 102 and the access opening 140 closed.

The unit 24' is mounted on the frame 12 and the open end 132 of the liner bag 106 extended through the inlet opening 134 to receive the FIP material L in the liner 106. The FIP material L is poured into the liner bag 106 through the inlet opening 134 and the custom contoured backrest cushion 136 produced using the same techniques as described above with respect to the first embodiment of the backrest unit 24.

Because the foam layer 108 and lateral support member 148 are positioned within the liner bag 106, they are molded in place within the cushion member 136 during the foam-in-place molding process. The holes 152 and 156 of the lateral support member 148 permit the FIP material L to flow and expand through the mounting board 150 and lateral supports 154 during formation of the backrest cushion member 136 and, as a result, the lateral support member 148 becomes securely interlocked with the cushion member 136. The lateral supports 154 continue to provide needed lateral support to the occupant P after it is molded in place with the cushion member 136.

FIG. 9 shows the third embodiment of the seat unit 24" and is particularly designed to accommodate persons having a kyphosis hump resulting from abnormal posterior curvature of the spine. The backrest unit 24' has a rigid cushion support member comprising a support box 162 fabricated of rigid glass fiber composite material of the type used to form the support panels 144 and 110 of the previously described backrest units. The support box 162 has a continuous back 164 provided with mounting studs 165 and from which a pair of sides 166, a bottom 168, and a top portion 170 project forwardly and terminate at an open front 172 defining a recess 174 of the box 162.

A cushion assembly 176 is accommodated in the recess 174 and includes a pliable backrest cushion bag or cover 178 that is similar to the backrest cover 100 previously described in that it includes a front panel 180 constructed preferably of the same stretchable material as the front panel 114 of cover 100, a back panel 182, a pair of lateral side panels 184, and top and bottom panels 186, 188 extending rearwardly of the front panel 180 joining it to the back panel 182 and forming a box-like cavity 190 within the cover 178. The depth of the recess 174 and corresponding cavity 190 is selected according to the severity of the patient's kyphosis condition, to allow the kyphosis hump to recess into the box 162 and the remaining portion of the occupant's back to be supported generally parallel to the back 182 of the backrest unit 24'. A typical depth of the recess 174 and cavity 190 is four inches.

When positioned in the recess 174, the top 186, bottom 188, and side 184 panels of the backrest cover 178 are supported by the top 170, bottom 168, and side 166 walls of the support box 162 with the front panel 180 being flush with the support box front opening 172. The backrest cover 178 has mounting flaps 192 extending about the perimeter of the front panel 180 and adapted to be wrapped about a rigid peripheral flange 194 surrounding the perimeter of the front opening 172 of the support box 162. The mounting flaps 192 and support box 162 have mutually engageable coupling means and preferably a plurality of snap couplings having mutually engageable portions 196, 198 secured to the mounting flaps 192 and support box 162, respectively, to enable the mounting flaps 192 removably to be secured to the support box 162.

Within the cavity 190 of the backrest cover 176 there is a supportive foam cushion layer 200 adjacent the back panel 182 of the cover 178 that is of the same type and serves the same purpose as the foam layers 92 and 108 described above. A relatively thinner foam layer 202 is adhered or otherwise secured to the back side of the front panel 180 and is of the same type as the foam layer 94 previously described and used for the same purpose.

The backrest cover 178 has an inlet access opening 204 formed on the top panel 96 extending substantially between the side panels 184. The access opening 204 has a zipper closure 206 to enable the opening 204 to be selectively opened and closed. The top 170 of the support box 162 has an opening 208 and a removable cover plate 210 for selectively covering the opening 208. The cover 210 and support box 162 have cooperating snap coupling portions 212 and 214 for removably securing the cover plate 210 to the support box 162.

The cushion assembly 176 includes a liner bag 216 of the same type described above with respect to the backrest units 24 and 24'. The open end 218 of the liner bag 216 is extendable through the access opening 204 of the cover 178 and further through the opening 208 in the support box 162 to enable the same FIP material L described previously to be poured into the liner bag 216 through the liner bag inlet opening 220, forming a resultant supportive backrest cushion member 222 within the liner bag 216. The cover 178 has a cushion access opening 224 that extends across the sides 184 and top 186 panels of the cover 178 and is sufficiently large to enable the cushion member 222 and liner bag 216 to be removed from the backrest cover 178 for reshaping and replacement in the same manner as previously described. The cushion access opening 224 similarly has a closure in the preferred form of a zipper 226 to enable the opening 224 to be selectively open and closed as needed.

The disclosed embodiments are representative of presently preferred forms of the invention, but are intended to be illustrative rather than definitive thereof. The invention is defined in the claims.

What is claimed is:

1. A method of producing a custom-profiled cushion assembly for a body support, said method comprising the steps of:

providing a pliable cushion bag having a cavity therein and an access opening into the cavity;

providing a foam-impermeable liner that is formed apart from the cushion bag and has at least one opening therein for admitting expandable, curable liquid foam-in-place material into the liner;

installing the liner in the cavity in separable, removable relation to the cushion bag and cavity and locating the liner opening so that it is accessible through the access opening of the cushion bag;

introducing expandable, curable, liquid foam-in-place material into the liner through the liner opening;

positioning a selected portion of a person's body having a predetermined profile against the cushion bag while the liquid foam-in-place material expands and cures and conforms to the profile of the selected body portion to produce a resultant foam cushion member having a custom-profiled support surface; and providing the cushion bag with a cushion member access opening sized in relation to the cushion member and laying open the cushion bag, thereby enabling selective access to and removal of the liner and cushion member intact from the cavity of the cushion bag through the cushion member access opening.

2. The method of claim 1 including removing the liner and cushion member from the cushion bag, modifying the molded profile of the cushion support surface, and thereafter replacing the modified cushion member in the cushion bag cavity.

3. The method of claim 1 wherein the opening of the liner has a spout, said method including extending said spout out of the cavity through the access opening of the cushion bag before introducing the foam-in-place material into the liner bag.

4. The method of claim 3 including closing the spout during expansion of the foam-in-place material to contain expansion of the foam-in-place material within the liner bag to develop the desired contour of the foam-in-place material and re-opening the spout after the desired contour is obtained to allow gases and any excess expanding foam-in-place material to escape from the liner.

5. A method of producing a custom-profiled cushion assembly for use as a body support, said method comprising:

provising a pliable cushion bag having a cavity therein and an access opening into the cavity;

positioning a removable liner having an opening therein within the cavity;

introducing expandable, curable liquid foam-in-place material into the liner through the liner opening;

positioning a selected portion of a person's body having a predetermined profile against the cushion bag while the liquid foam-in-place material expands and cures and conforms to the profile of the selected body portion to produce a resultant molded foam cushion member having a custom-profiled support surface;

providing the cushion bag with a cushion member access opening of sufficient size to enable selected access and removal of the liner and cushion member from the cavity of the cushion bag; and removing the liner and cushion member from the cushion bag through the cushion member access opening in the cushion bag.

* * * * *